US012731172B2

(12) United States Patent
Wang et al.

(10) Patent No.: US 12,731,172 B2
(45) **Date of Patent: *Sep. 8, 2026**

(54) COMBATING FALSE INFORMATION WITH CROWDSOURCING

(71) Applicant: Google LLC, Mountain View, CA (US)

(72) Inventors: Gang Wang, Frederick, MD (US); Yian Gao, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/895,735

(22) Filed: Sep. 25, 2024

(65) Prior Publication Data

US 2025/0014071 A1 Jan. 9, 2025

Related U.S. Application Data

(63) Continuation of application No. 17/269,155, filed as application No. PCT/US2020/033598 on May 19, 2020, now Pat. No. 12,236,450.

(51) Int. Cl.
*G06Q 30/0241* (2023.01)
*H04L 9/32* (2006.01)

(52) U.S. Cl.
CPC ....... *G06Q 30/0248* (2013.01); *H04L 9/3247* (2013.01); *G06Q 2220/00* (2013.01)

(58) Field of Classification Search
CPC .................... G06Q 20/00–425; H04L 9/00–50
See application file for complete search history.

(56) References Cited

U.S. PATENT DOCUMENTS

2005/0278253 A1* 12/2005 Meek ...................... G06F 21/31 705/50
2009/0292924 A1* 11/2009 Johnson ................ G06F 21/316 713/176

(Continued)

FOREIGN PATENT DOCUMENTS

CN 109845232 6/2019
CN 110199315 9/2019

(Continued)

OTHER PUBLICATIONS

Aki et al., “Digital signatures: a tutorial survey” IEEE Annals of the History of Computing, Feb. 1983, 16(02):15-24.

(Continued)

*Primary Examiner* — Ari Shahabi
(74) *Attorney, Agent, or Firm* — Fish & Richardson P.C.

(57) ABSTRACT

Methods, systems, and apparatus, including computer programs encoded on a computer storage medium, for combating false advertising using crowdsourcing. In one aspect, a method includes receiving a false digital component alert indicating that a digital component presented at a client device includes false information, validating the false digital component alert based on a public key to verify digital signature included in the false digital component alert matching the public key of stored attestation tokens specifying presentation and interaction data for the digital component. In response, adding the false digital component alert to an aggregated report. Based on a false alert ratio, determining that a magnitude of validated false digital component alerts in the aggregated report meets a threshold, and triggering a false digital component mitigation response including providing a false information warning with the false digital component to one or more client devices or digital component provider.

21 Claims, 4 Drawing Sheets

(56) References Cited

U.S. PATENT DOCUMENTS

| | | | | |
|---|---|---|---|---|
| 2014/0282696 | A1* | 9/2014 | Mao | H04N 21/2547 725/32 |
| 2017/0140394 | A1* | 5/2017 | Cao | G06Q 30/0201 |
| 2018/0240131 | A1* | 8/2018 | Denner | G06Q 30/0185 |
| 2019/0036937 | A1* | 1/2019 | Cullison | H04L 63/102 |

FOREIGN PATENT DOCUMENTS

| | | |
|---|---|---|
| JP | 2006-285844 | 10/2006 |
| JP | 2009-157594 | 7/2009 |
| JP | 2020-507769 | 3/2020 |
| JP | 2020-052603 | 4/2020 |
| JP | 2021-504861 | 2/2021 |
| JP | 2022-504440 | 1/2022 |
| WO | WO 2019018689 | 1/2019 |
| WO | WO 2019106659 | 6/2019 |
| WO | WO 2020097277 | 5/2020 |

OTHER PUBLICATIONS

Notice of Allowance in Japanese Appln. No. 2021-505216, mailed on Feb. 20, 2023, 5 pages (with English translation).
Office Action in Chinese Appln. No. 202080004272.2, mailed on Oct. 16, 2024, 9 pages (with English machine translation).
Office Action in European Appln. No. 20731691.0, mailed on Nov. 19, 2021, 13 pages.
Office Action in Japanese Appln. No. 2021-505216, mailed on Aug. 29, 2022, 12 pages (with English translation).
Office Action in Korean Appln. No. 10-2021-7000810, mailed on Apr. 3, 2024, 10 pages (with English translation).
Notice of Allowance in Korean Appln. No. 10-2021-7000810, mailed on Sep. 22, 2025, 4 pages (with English translation).
Extended European Search Report in European Appln. No. 25191086.5, mailed on Sep. 15, 2025, 9 pages.

* cited by examiner

COMBATING FALSE INFORMATION WITH CROWDSOURCING

CROSS-REFERENCE TO RELATED APPLICATION

This application is a continuation application and claims priority to U.S. application Ser. No. 17/269,155, filed on Feb. 17, 2021, which is a National Stage Application under 35 U.S.C. § 371 and claims the benefit of International Application No. PCT/US2020/033598, filed on May 19, 2020. The disclosures of the foregoing applications are hereby incorporated by reference in their entirety.

BACKGROUND

Distribution of false information significantly deteriorates users' online experience. Reporting of false information by users can compromise user privacy leading to underreporting or privacy/security issues for the reporting users. Additionally, erroneous reports of false information can hinder the distribution of content by content providers.

SUMMARY

This specification describes technologies relating to combating false advertising using crowdsourcing to protect user privacy and prevent fraudulent reporting of false advertising.

In general, one innovative aspect of the subject matter described in this specification can be embodied in methods that include the actions of receiving, by the one or more servers, a false digital component alert indicating that a digital component presented at a client device includes false information. The false digital component alert is validated based on a public key to verify digital signature included in the false digital component alert matching the public key of stored attestation tokens specifying presentation and interaction data for the digital component, and in response to validating the false digital component alert, adding the false digital component alert to an aggregated report for the digital component. Based on a false alert ratio, it is determined that a magnitude of validated false digital component alerts in the aggregated report for the digital component meets a threshold, and triggering a false digital component mitigation response based on the magnitude of the validated false digital component alerts meeting the threshold, providing a false information warning with the false digital component to one or more client devices or digital component provider. Other embodiments of this aspect include corresponding systems, apparatus, and computer programs, configured to perform the actions of the methods, encoded on computer storage devices.

These and other embodiments can each optionally include one or more of the following features. In some implementations, the methods further include providing a false information warning with the false digital component to one or more client devices or digital component provider.

In some implementations, the methods further include reducing or halting distribution of the false digital component based at least in part on the false digital component mitigation response. Reducing or halting distribution of the false digital component can be performed by a digital component provider. Reducing or halting distribution of the false digital component can be performed by a browser, an application or an operating system of the client device.

In some implementations, the methods further include receiving, by another client device, the false digital component mitigation response, and reducing or halting distribution of the false digital component by a browser, an application or an operating system of the another client device. Reducing or halting distribution of the false digital component can include preventing output of the false digital component on the client device. Reducing or halting distribution of the false digital component can include preventing output of the false digital component on the another client device.

In some implementations, the stored attestation tokens specifying presentation and interaction data for digital components include multiple impression attestation tokens for multiple presentations of the digital component, and multiple click attestation tokens, each click attestation token corresponding to a particular impression attestation token of the multiple impression attestation tokens, and/or multiple conversion tokens, each conversion token corresponding to a particular conversion attestation token of the multiple conversion attestation tokens.

In some implementations, each impression attestation token of the multiple impression attestation tokens includes i) a campaign ID, ii) a date/time of presentation, and iii) a uniform resource locator for a landing page linked to by a particular digital component.

In some implementations, the impression attestation token can include i) a campaign ID, ii) a date/time of presentation, and iii) an advertisers phone number (e.g., for click-to-call advertisements) or geo-fencing of an advertiser's store location (e.g., for in-store visit advertisements).

In some implementations, each click attestation token of the multiple click attestation tokens includes a conversion confirmation of a user action performed in response to the presentation of the digital component.

In some implementations, validating the false digital component alert includes determining the false digital component alert includes a particular impression attestation token and a corresponding particular click attestation token and/or other relevant conversion attestation token for the digital component.

In some implementations, providing the false information warning to one or more client devices with the false digital component includes providing a visual signal for presentation with the false digital component on a client device. The visual signal can include presenting a user on the client device an option to not proceed with an associated action, e.g., not proceed to a landing page, not proceed to dial the advertiser's phone number, locating the advertiser's store location (e.g., open a mapping application and accessing a geo-fence for the store location), etc., defined by the digital component. Providing the false information warning to one or more client devices with the false digital component can include providing a validated false digital component report to a publisher of the digital component.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Using server-side validation and aggregation of false digital component alerts from multiple users protects individual user privacy while allowing consumers to report false digital components in a verified way. Validation of the false digital component alerts using attestation tokens protects the interests of the publisher of the digital component by preventing malicious or false reporting (e.g., by malicious entities) of the digital components. False advertising reports that are reported by users rather than by particular companies or interested parties can be perceived as more neutral and therefore more trustworthy.

This subject matter can be utilized to rapidly identify false information distributed through an online system using crowdsourcing. Bad actors can be prevented from falsely reporting information as fake, by independently verifying that the reporting user has viewed and interacted with the content. By ensuring that the false digital content alerts being processed are valid prior to the processing of the alerts, the processing, memory, and resources being used to provide content to end-users is reduced because resources are not being utilized to store, distribute, or present the false information. Additionally, using attestation tokens can assist in classifying digital components as false in a more reliable and efficient manner, reducing the resources required to store and distribute misleading information. For example, the attestation tokens are configured to ensure that the alerts of false information are made by users that were actually exposed to and/or interacted with digital components that contained the false information, while still preserving the user's privacy. As such, the false information alerts can be confirmed to be legitimate rather than being made by malicious actors (e.g., entities trying to harm a particular content distributor). As such, resources are not wasted processing illegitimate false information alerts, and the resulting metrics and/or reports providing information about digital components that contain false information are made more accurate and are more efficiently created because of the ability to validate each false information alert as legitimate or illegitimate using the attestation tokens.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Overview

In general, this document relates to computer implemented methods and systems to validate and report distribution of false digital components (e.g., video clips, audio clips, multimedia clips, images, text, or another unit of content) using crowdsourcing. User alerts of (e.g., submissions identifying) false digital components are validated using content request attestation, subsequent impression attestation and click attestation in response to, or as the result of the content request attested by the content request attestation, and are aggregated by a server to maintain user privacy of the user making the alerts. A digital component that is reported as a false digital component by a threshold portion of the users who view/interact with the digital component is flagged as a false digital component for future presentations of the digital component to users. Reporting of the false digital component can be provided to content providers, publishers, and end-users. The distribution of digital components that present false information can be limited, modified, or halted, as discussed throughout this document.

Operating systems (OS), applications or browsers may provide user interfaces to enable users exposed to false digital components to report the false digital components in a privacy-preserving manner. In particular, the OS/browser can send a false digital component alert from a user to a central aggregation server(s) that implements privacy-preserving aggregation measurements. Additionally, to preserve the interests of the content publishers, measures to prevent fraudulent reporting are taken to validate each false digital component alert using encrypted content request attestation tokens, impression attestation tokens and click attestation tokens. Validating the entire causality chain of events, e.g., content request, user impression of the content, and user interaction with the content, via attestation tokens can detect falsified reports more effectively. User interfaces can alert users viewing digital components that have been deemed to contain false information in future views, e.g., through visual alerts in the user interface, as described in further detail below with reference to FIGS. 2 and 3.

Example Operating Environment

Figure 1:
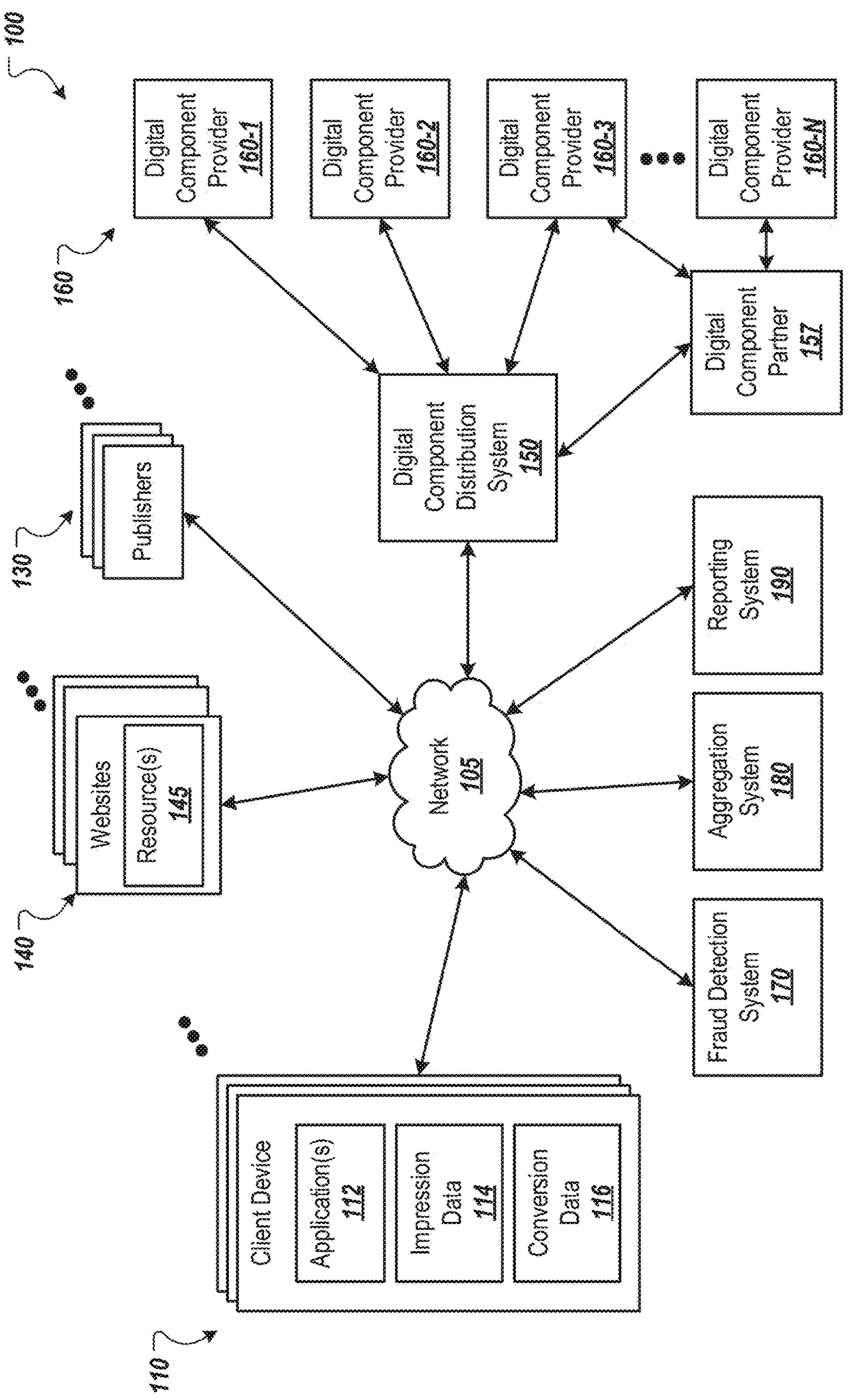
FIG. 1 is a block diagram of an environment in which a digital component system distributes digital components.

FIG. 1 is a block diagram of an environment 100 in which a digital component system 150 distributes digital components. The example environment 100 includes a data communication network 105, such as a local area network (LAN), a wide area network (WAN), the Internet, a mobile network, or a combination thereof. The network 105 connects client devices 110, publishers 130, websites 140, the digital component distribution system 150, a detection system 170, an aggregation system 180, and a reporting system 190. The example environment 100 may include many different client devices 110, publishers 130, and websites 140. In some implementations, the environment 100 can also include multiple digital component distribution systems 150.

A website 140 is one or more resources 145 associated with a domain name and hosted by one or more servers. An example website is a collection of web pages formatted in HTML that can contain text, images, multimedia content, and programming elements, such as scripts. Each website 140 is maintained by a publisher 130, which is an entity that controls, manages and/or owns the website 140.

A resource 145 is any data that can be provided over the network 105. A resource 145 is identified by a resource address, e.g., a Universal Resource Locator (URL), that is associated with the resource 145. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts).

A client device 110 is an electronic device that is capable of communicating over the network 105. Example client devices 110 include personal computers, mobile communication devices, e.g., smart phones, and other devices that can send and receive data over the network 105.

A client device 110 typically includes applications 112, such as web browsers and/or native applications, to facilitate the sending and receiving of data over the network 105. A native application is an application developed for a particular platform or a particular device. Publishers 130 can develop and provide, e.g., make available for download, native applications to the client devices 110. In some implementations, the client device 110 is a digital media device, e.g., a streaming device that plugs into a television or other display to stream videos to the television. The digital media device can also include a web browser and/or other applications that stream video and/or present resources.

A web browser can request a resource 145 from a web server that hosts a website 140 of a publisher 130, e.g., in response to the user of the client device 110 entering the resource address for the resource 145 in an address bar of the web browser or selecting a link that references the resource address. Similarly, a native application can request application content from a remote server of a publisher 130.

Some resources 145, application pages, or other application content can include digital component slots for presenting digital components with the resources 145 or application pages. As used throughout this document, the phrase "digital component" refers to a discrete unit of digital components or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components by the digital component distribution system 150 can thus supplement, and generally enhance, the web page or application content.

When the application 112 loads a resource 145 (or application content) that includes one or more digital component slots, the application 112 can request a digital component for each slot from the digital component distribution system 150. The digital component distribution system 150 can, in turn request digital components from digital component providers 160. The digital component providers 160 are entities that provide digital components for presentation with resources 145.

In some cases, the digital component distribution system 150 can also request digital components from one or more digital component partners 157. A digital component partner 157 is an entity that selects digital components 129 (not shown in FIG. 1) on behalf of digital component providers 160 in response to digital component requests.

The digital component distribution system 150 can select a digital component for each digital component slot based on various criteria. For example, the digital component distribution system 150 can select, from the digital components received from the digital component providers 160 and/or the digital component partners 157, a digital component based on relatedness to the resource 145 (or application content), performance of the digital component (e.g., a rate at which users interact with the digital component), etc. The digital component distribution system 150 can then provide the selected digital component(s) to the client device 110 for presentation with the resource 145 or other application content.

When the application 112 presents a digital component, the application 112 (which could be a browser) can store impression data 114 for the presentation of the digital component. The impression data 114 for a particular presentation of a digital component can include a URL or domain of a landing page for the digital component (e.g., a page linked to by the digital component and when the user clicks or interacts with the digital component, the application/browser presents the page to the user), one or more identifiers for the digital component, event-level data associated with the impression, an expiration time that specifies when the impression data is to be deleted from the client device 110, and/or a reporting URL or domain to which conversion reports for the digital component are to be sent. This data can be provided by the digital component, e.g., as metadata of the digital component or an anchor tag of the digital component. As described in more detail below, rather than storing, or in addition to storing, raw impression data for each impression of a digital component, the application 112 can store impression data that is blindly signed by the detection system 170 to attest the authenticity of the impression event and impression data.

The application 112 can also store conversion data 116 in response to a conversion being detected. A conversion for a digital component is the completion of a specified user action after the digital component is presented to and/or interacted with (e.g., clicked or tapped) by the user. The conversion data 116 for a conversion can include data that indicates a type of the conversion as some conversions can have multiple types. The type of a conversion can specify a subsequent action after the conversion is completed. For example, a conversion may be the addition of an item to an online shopping cart. In this example, a first type of conversion may be the addition of the item without checking out (e.g., not completing a purchase) and a second type of conversion may be checking out. As described in more detail below, the conversion data for a conversion can be a set of one or more bits that indicate the type of conversion and the application can store conversion data that is blindly signed by the digital component distribution system 150 (or another appropriate system) to attest the authenticity of the conversion event and conversion data.

The detection system 170 can evaluate fraud signals received from the client device 110 to determine whether an impression or conversion is valid or fraudulent. The fraud signals can be dependent on the application and can vary in different implementations. The application 112 (or the operating system on client device 110) can include an API that enables a digital component to make a call to the application 112 (or the operating system on client device 110) to collect the fraud detection signals and provide the fraud detection signals to the detection system 170. In addition to the fraud detection signals, the application 112 can send blinded impression data for the impression to the detection system 170. If the detection system 170 determines that the impression is valid, the detection system 170 can sign the blinded impression data and provide the signed blinded impression data to the application 112 (or the operating system on client device 110). Example techniques for generating blinded impression data and signing the blinded impression data are described below.

The aggregation system 180 can generate aggregated network measurements based on data received from client devices 110. In the following description, the techniques for generating and providing measurement data elements is described as being performed by the application 112, which can be a web browser or native application. However, in some implementations, the operating system of the client device 110 can generate and send the measurement data elements. In such implementations, the web browser(s) and application(s) on the client device 110 can be configured to report impressions and conversions to the operating system. The operating system can perform each of the operations for reporting the impressions and conversions described below as being performed by the application 112.

The application 112 on the client devices 110 can provide, to the aggregation system 180, measurement data elements that include encrypted data that represents network data. The network data can include impression data and/or conversion data for each conversion. For example, the application 112 can generate and send to the aggregation system 180, a measurement data element for each impression, user interaction, and/or conversion that takes place at the client device 110. The aggregated network measurements can include, for each of one or more digital components, a total number of impressions, user interactions, and/or conversions for the digital component across multiple client devices 110 or applications 112.

In some implementations, a secure, privacy preserving aggregation system can be implemented as follows: the application 112 can use an (t, n) threshold scheme to generate the data in a measurement data element. In some implementations, when the application 112 detects a conversion or receives conversion data for a conversion, the application 112 generates a group key (e.g., a polynomial function) based on impression data and conversion data for the conversion. The application can then generate a group member key that represents a portion of the group key and that can be used to regenerate the group key only when a sufficient number of group member keys for the same impression and conversion pair are received. In this example, the measurement data element for a conversion can include the group member key generated by the application and a tag that corresponds to the impression and conversion pair. Each unique impression and conversion pair can have a corresponding unique tag so that the aggregation system 180 can aggregate the measurement data elements for each impression and conversion pair using its tag.

In a (t, n)-threshold encryption scheme, the aggregation server 180 would need to receive at least t group member keys for the same impression and conversion pair to be able to decrypt the impression and conversion data. If less than t group member keys are received, the aggregation server 180 cannot decrypt the impression and conversion data. Once at least t measurement data elements for the same impression and conversion pair are received from client devices 110, the aggregation system 180 can determine the group key from the at least t group member keys and obtain the impression and conversion data from the group key.

The aggregation system 180 can determine the quantity of the conversions for an impression and conversion pair based on the number of measurement data elements received that includes impression data and conversion data for the impression and conversion pair. For example, after obtaining the impression and conversion data using the at least t group member keys, the aggregation system 180 can determine, as the quantity of conversions, a count of the number of the group member keys received for the impression and conversion pair. The aggregation system 180 can report the impression data, the conversion data, and the quantity of the conversions to the reporting system 190, which may be implemented as a reporting domain that corresponds to a reporting URL of the digital component that, in turn, corresponds to the impression and conversion data. In some embodiments, another secure, privacy preserving aggregation system can implement a multi-party computation (MPC).

False Digital component Reporting And Validation

Figure 2:
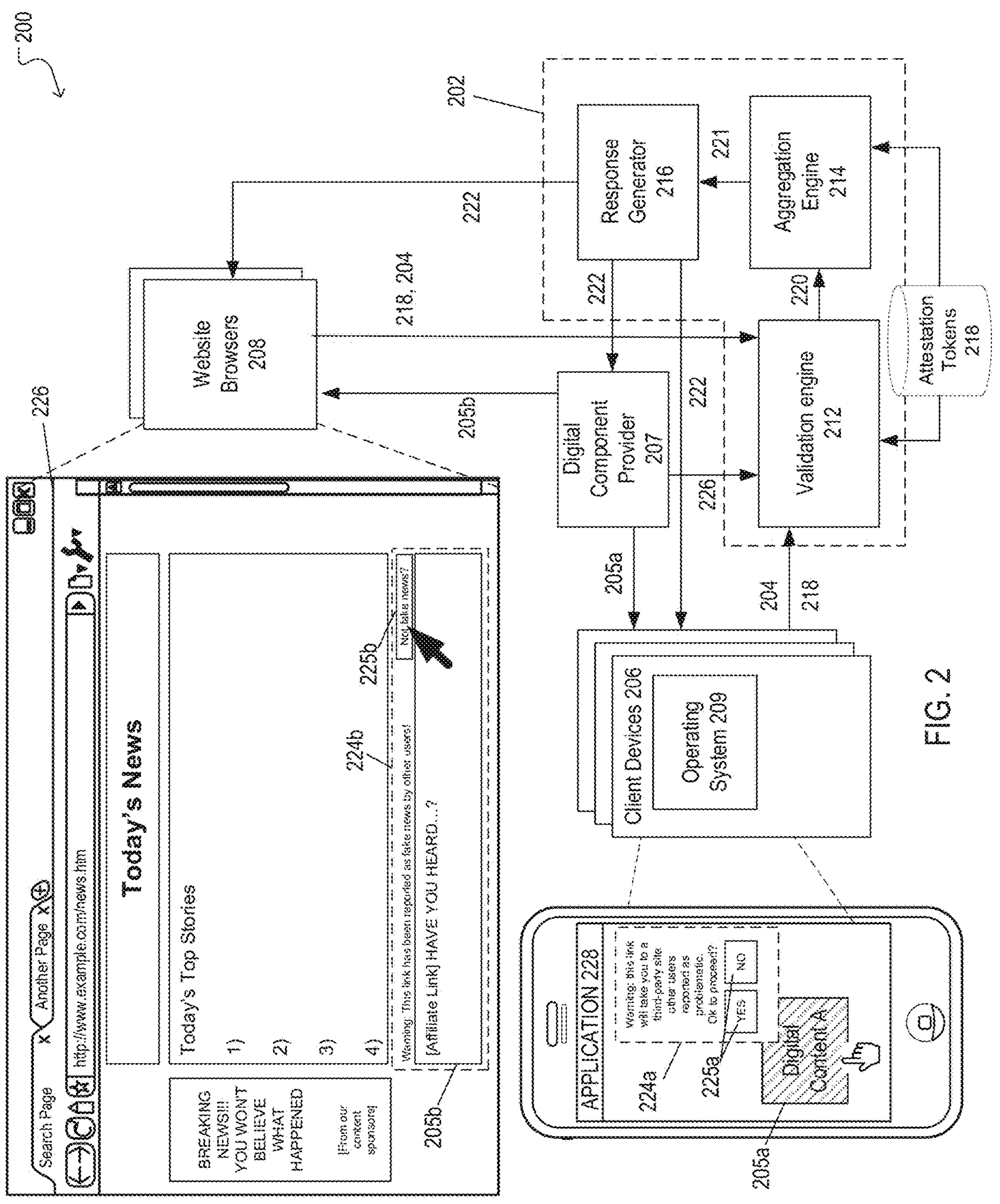
FIG. 2 is a block diagram of an environment in which false digital components are reported.

Digital component system 150 can distribute digital components from various digital component providers 160 to client devices 110. Digital components can be flagged as false, e.g., spam, fake, or misleading, by users of the client devices 110. The generated alerts for the false digital components can be verified and aggregated in order to protect the privacy of the reporting end-user as well as preserving the interests of the digital component providers 160. FIG. 2 is a block diagram of an environment 200 in which false digital components are validated and reported. A false digital component refers to a digital component that contains false or misleading information. False digital component reporting server 202 is configured to receive false digital component alerts 204 responsive to digital components 205*a,b* provided by a digital component provider 207 from client devices 206 and/or browsers 208 as input and provide false information response 222 as output to the client devices 206 and/or browsers 208.

False digital component reporting server 202 can include a validation engine 212, aggregation engine 214, and a response generator 216. In some implementations, the processes performed by the validation engine 212, aggregation engine 214, and response generator 216 can be performed by more or fewer modules. Validation engine 212 is configured to receive alerts 204 from an operating system 209 of a client device 206 and/or alerts 204 from a website browser 208. Additionally, the validation engine receives attestation tokens 218 from the respective operating system 209 and/or browser 208.

In some implementations, attestation tokens 218 include impression attestation tokens, e.g., impression data 114 described with reference to FIG. 1. Impression tokens generated by the presentation of a digital component 205*a,b* on a client device or web browser can include one or more of campaign identification information, a date and time of the presentation of the digital component, a uniform resource locator (URL) of a landing page linked to by the digital component, and a digital signature created by the operating system or web browser. In some implementations, impression tokens can include a phone number for click-to-call ads, or a physical location for in-store visit ads.

In some implementations, the attestation token 218 may carry the identity of the application 112 (e.g. "Application A") or the domain that the user is browsing (e.g. example.com). In some implementations, the attestation token 218 may carry additional parameters describing the impression, user interaction or conversion. In some implementations, impression tokens may carry an device integrity token or browser trust token created by detection system 170 to attest that the device/browser is trustworthy, and/or user's behavior on the device or in the browser is genuine. The device integrity token/browser trust token may carry the level of trustworthiness/genuineness, timestamp when the device integrity token/browser trust token was generated, the device/browser's public key or its crypto hash to bind the device integrity token/browser trust token to the device/browser, as well as the detection system 170's digital signature so that anyone can verify the authenticity of the device integrity token/browser trust token.

In some implementations, attestation tokens 218 include click attestation tokens, e.g., conversion data 116 described with reference to FIG. 1. Each click attestation corresponds to a particular impression token, and is generated by a user-interaction with the presented digital component. Click attestation tokens can include a digital signature from the client device where the click occurred. In some implementations, the click attestation token includes a conversion confirmation of a user action performed in response to the presentation of the digital component. A user action can include, for example, a user clicking a hyperlink and following it to a linked landing page. In another example, a user action can be the user scrolling through at least a portion of a news article (or other content). In yet another example, a user action can be the user providing feedback, e.g., a "like," "dislike," or "share" button, in response to presentation of the digital component. In some implementations, the click token may include the source of the interaction, e.g. whether the interaction is from a stylus, mouse, keyboard, trackball, touchscreen, or programmatically injected by the application 112, an virtual keyboard on screen. In some implementations, the click token may include metadata indicating which subset the information included in the token is self-declared by the application 112 vs. verified by the operating system of the client device 110.

The attestation tokens 218 can be validated and aggregated, e.g., as described in FIG. 1 with reference to the aggregation system 180, by the validation engine 212 and aggregation engine 214. Validation engine 212 can receive an alert 204 and attestation tokens 218 and validate the alert 204. Validation of the alert 204 can include verifying the impression or presentation of the digital component, verifying a user interaction with the digital component, and verifying the alert as generated in response to a report by a same human user who both viewed and interacted with the digital component. Further details of the validation process is described below with reference to FIG. 3.

Validated alerts 220 are provided as output from the validation engine 212 to the aggregation engine 214. Aggregation engine 214 is configured to receive the validated alerts 220 as input and determine, from the aggregated validated alerts 220 and the attestation tokens 218, that a magnitude of the validated alerts 220 meets a threshold. A magnitude of the validated alerts 220 can be a ratio of the validated alerts 220 responsive to the digital component 205*a,b* versus a total number of presentations of the digital component 205 *a, b* to users, or total number of users exposed to the digital component 205, or total number of attestation tokens 218 for the digital component. For example, for 1000 users who viewed and interacted with the digital component 205*a*, 100 of the users generated false digital component alerts 204 responsive to the digital component 205*a*, meeting a threshold of 10% of the total views/interactions resulting in alerts 204.

In some implementations, a magnitude of the validated alerts 220 can be a number of alerts for the digital component 205*a,b* from a start of a campaign, e.g., a first impression of the digital component on a client device 206 and/or website browser 108. The false digital component reporting server 202 can have an aggregation threshold that is a total number of validated alerts that are permissible before triggering a response to the digital component 205*a,b*. For example, once the aggregation engine 214 has recorded 100 validated alerts 220 total from a start of a campaign for the digital component 205*a*, a threshold magnitude of validated alerts 220 is met.

In response to determining the threshold of validated alerts 220 has been met, the aggregation engine 214 can provide a response trigger 221 as output to the response generator 216. Response generator 216 receives a response trigger 221 as input and provides a false digital component mitigation response 222 as output. The false digital component mitigation response 222 can be provided to one or more client devices 206 and/or website browsers 208. In one example, a false information warning 224*b* is provided with the digital component 205*b* in a resource 226 by the web browser 208. In another example, a false information warning 224*a* is provided with the digital component 205*a* in an application environment 228.

In some implementations, a browser or operating system can query the server 202 for a false information response 222, e.g., a report, for a particular digital component 205 prior to requesting the digital component from the digital component provider 207. For example, prior to selecting a digital component from a particular digital component provider 207, a browser can check the digital component for false digital component alerts in order to determine whether to serve the digital component in the active window.

In some implementations, a browser or operating system can query the false information response 222 for a current digital component 205 presented on a client device, e.g., in order to provide a false information warning 224*a* along with the digital component 224*b*.

As depicted in FIG. 2, the false information warning 224*a,b* can include information to the user related to the reports of the digital component being a false digital component. In some implementations, the false information warning 224*a* is an overlay display over a current view in the application environment, e.g., a pop-up, including information warning a user of false digital content.

Additionally, the false information warning 224*a* can include active buttons 225*a,b* for a user to interact with the false information warning 224*a*. As depicted in FIG. 2, active buttons 225*a,b* include "yes" and "no" that allow a user to proceed to a landing page or other action associated with the selection of digital component 205*a*, or to not proceed with the process or action associated with the selection digital component 205*a*, respectively.

In some implementations, a user's selection of an active button 225*a,b* can provide feedback to the server 202. User selection of an active button 225*a* that causes the action to proceed for the digital component 205*a*, e.g., proceed to a landing page, can be received by the server 202 as part of a click attestation and utilized to re-evaluate the threshold for the digital component 205*a*. In one example, for a magnitude of validated selections of the active button 225*a*, e.g., "yes" or "proceed," that causes the user interacting with the digital component 205*a* to proceed to a landing page for the digital component 205*a*, the server 202 may re-evaluate the labeling of the digital component 205*a* as a false digital component 205*a*. The re-evaluation process may involve a review by a human-expert.

In some implementations, as depicted in FIG. 2, the false information warning 224*b* is an overlay, bounding box, or sticker displayed with the digital component 205*b* to warn the user of the false digital component 205*b*. The false information warning 224*b* can include an active button 225*b* that allows a user to provide feedback responsive to the false information warning 224*b*. Active button 225*b* can allow a user to indicate that the false information warning 224*b* is incorrect, e.g., that a news article is incorrectly labeled as fake news. A selection of the active button 225*b* can be provided to server 202 with a click attestation token to trigger re-evaluation of the false digital component mitigation response 222.

In some implementations, the false digital component mitigation response 222 is provided to the digital component provider 207. The false digital component mitigation response 222 can be, for example, a report notifying the digital component provider 207 that validated alerts 220 have been received by the false digital component reporting server 202 responsive to presentations of a digital component 205*a*. In the example of the report being provided to the digital component provider 207, information about the particular reporting users of the client devices and/or browsers 208 can be anonymized or removed before providing the report to the digital component provider 207.

In some implementations, the digital component provider 207 can provide an appeal 226 to the false digital component reporting server 202, for example, responsive to a received false digital component mitigation response 222. In one example, a digital component provider 207 can appeal 226 a false digital component mitigation response 222 that labels a digital component 205*a,b*. The appeal 226 can trigger a human-expert review of the digital component 205*a,b* in question to determine whether or not the mitigation response 222 is accurate, e.g., whether the digital component 205*a,b* is mislabeled as a false digital component 205*a,b*.

In some implementations, validation and aggregation of the alerts 204 responsive to the presentation of digital components 205 is performed by the digital component provider 207. The digital component provider 207 can determine, based on the magnitude of validated alerts 220 meeting a threshold, to trigger a human-expert review of the digital component 205*a,b*. For example, an online news platform can validate and aggregate the alerts 204 responsive to news reports on their platform, e.g., to determine which news reports are being flagged by readers as fake news.

In some implementations, the false digital component reporting server 202 can determine that a particular source, e.g., a particular digital component provider 207, is a source of multiple false digital components. The server 202 can generate a response 222 including alerting users of client devices that the digital component provider 207 is known to be a source of false digital components when a given digital component from the digital component provider 207 is presented on the client device. For example, a particular website domain may be associated with multiple validated false content, and the server 202 can generate a false digital component mitigation response 222, e.g., a report that alerts digital component provider 207*s* to be aware that digital components from the domain may be untrustworthy.

In some implementations, the server 202 can determine that a particular digital component provider 207, e.g., a website domain or application, is associated with multiple validated false digital components and provide reports 222 with some or all of the digital components 205*a,b* from the particular digital component provider 207. For example, a particular domain can be associated with multiple false news reports such that when a user is presented with a news report, the server 202 will provide a warning, e.g., "this website has been reported for fake news," preemptively.

In some implementations, a digital content provider 207 does not call on a browser 208 application programming interface (API) to generate an attestation token 218 for a digital component 205*b*. Web browser 208 can generate the attestation token 218, for example, using browser history. In one example, browser 208 may take a screenshot of the digital component 205*b* and/or verify a landing page for the digital component 205*b*.

In some implementations, the aggregation engine 214 may cluster similar digital components 205, e.g., similar in visual appearance, linked to a same landing page, etc., but may have different campaign identification information. The aggregation engine 214 may aggregate the validated alerts 220 from the clustered digital components 205, which can reduce the number of validated alerts 220 required from each of the digital components in the cluster to trigger a response 221.

In some implementations, the methods and systems described herein can be applied to validate and aggregate the distribution of other forms of digital components, for example, for malware identification, fake news distribution, social media, inappropriate content and the like.

Figure 3:
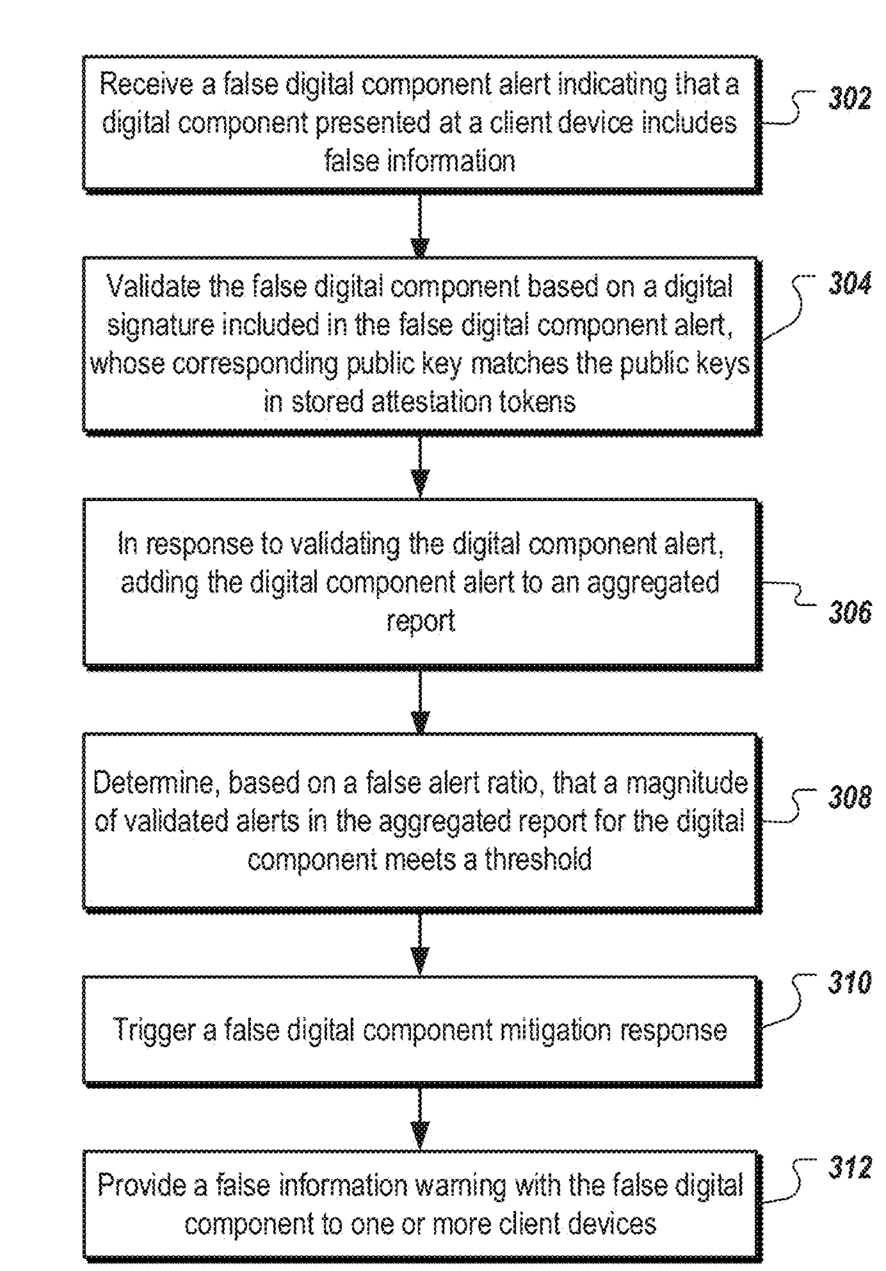
FIG. 3 is a flow diagram that illustrates an example process for crowdsourcing false advertising reports.

FIG. 3 is a flow diagram that illustrates an example process for crowdsourcing false digital component reports. A false digital component alert is received that indicates that a digital component presented at a client device includes false information (302). As depicted in FIG. 2, a false digital component alert 204 is received by the validation engine 212. The false digital component alert 204 has stored corresponding attestation token 218 including an impression attestation token, e.g., impression data 114, and/or a click attestation token, e.g., conversion data 116. Each attestation token 218 includes information for the presentation of a digital component to a user and (optionally) an interaction by the user with the digital component. A respective attestation token 218 can be generated for each instantiation of the digital component 205 on a client device, or for each user interaction with digital component 205.

In some implementations, the stored attestation token 218 for the particular instantiation of the digital component 205 includes an impression attestation token and/or a click attestation token. An impression attestation token can be generated as follows: the operating system 209 (or another trusted application 228 on client device 206 or web browser 208) receives a request from an application 228 or web browser 208 to generate a digitally signed token that may be partially or fully encrypted. This digitally signed token can be used to verify that the particular digital component 205 that is provided on a content page within the application 228 (or in webpage 226 of the web browser 208) and displayed at a particular portion of the display of the client device 206 and visible to a user, is a particular digital component 205 provided by a digital component provider 207.

In some situations, the operating system 209 (or another trusted application on the client device or a web browser) of the client device 206 determines whether a digital watermark is embedded in the particular digital component 205 displayed at the particular portion of the display, e.g., a touch screen for mobile devices and an LCD/LED display for desktop computers. As used in this specification, a trusted application is an application that operates within a secured environment on the device 206 and performs certain core device services (similar to device driver services performed by the privileged code within the operating system). If the operating system 209 (or a web browser 208) does not identify a digital watermark in the digital component 205, it concludes that the digital component 205 provided by the digital component provider 207, which would include such a watermark, is not visible on the client device 206. This may be indicative of an error in the content page, the content platform, the application, or the content provider. On the other hand, if the operating system 209 (or a web browser 208) identifies a digital watermark in the particular digital component 205, it decodes the digital watermark to obtain data for multiple attributes (e.g., content item identifier, content type, content description, content creator, etc.) that are descriptive of the particular digital component 205 being presented at the client device.

In some implementations, a hashed message authentication code (HMAC) algorithm can be used to protect metadata that the operating system extracts from the watermark.

The extracted watermark can be provided to a potentially untrusted application and then provided to a trusted application that will generate the impression attestation token including the watermark content in the payload. Utilizing the HMAC approach enables the trusted application to differentiate falsified watermark content from watermark content that has been extracted by the operating system.

Using this decoded data, the operating system 209 (or another trusted application 228 on the client device or a web browser 208) generates a digitally signed token that includes the data for the multiple attributes in the payload of the digitally signed token. In some implementations, the digitally signed token is an impression attestation token that includes (1) the client device's unique identifier (e.g., the device's public key), (2) the payload, (3) a device integrity token that can be used to evaluate the client device's trustworthiness, and/or (4) a digital signature of the device identifier for the client device, the payload, and the device integrity token, that is generated using the client device's private key. The digitally signed token, and in particular the impression attestation token, ensures that the receiver of the digitally signed token can identify if any of the data included in the token's payload (or otherwise) has been tampered with or forged. In the case where the web browser 208 generates the digitally signed token, the browser's native code generates the token. The browser native code has privileges that a script running on a webpage rendered by the browser does not have. The impression attestation token may be stored at the server 202 with the stored attestation tokens 218 for use in validating false digital component alerts 204. For example, the information in the impression attestation token can be used to verify that a user who submitted a false digital component alert 204 was, in fact, presented the digital component identified in the digital component alert, such that the integrity of false digital component alerts 204 can be ensured.

The trusted application (which may be part of or separate from the operating system of the client device or a web browser) can also receive a request from the application or webpage to generate a click attestation token indicating that a particular digital component was interacted with by the user. Before generating this click attestation token, the trusted application determines whether certain data included with the request, which is identified by the application as being obtained from the operating system 209 (or the web browser 208), is indeed generated and/or obtained from the operating system (or the web browser). This data can include data for a first set of parameters that is identified by the application as being descriptive of the first interaction and a first keyed-hash message authentication code (HMAC) that is identified by the application as being generated using the data for the first set of parameters. The trusted application provides this data to the operating system (or the web browser), which generates a second HMAC using the data for a first set of parameters that is included with the request.

If the second HMAC is not identical to the first HMAC, the operating system (or the web browser) determines that the first interaction is not an interaction by an actual human user and that there may be an error in the application (and/or its SDK) and/or the content platform. More specifically, for example, if the second HMAC result obtained by applying an HMAC algorithm on the first set of parameters that is identified by the application as being descriptive of the first interaction and a secret key that the operating system (or trusted application) keeps confidential is not identical to the first HMAC.

On the other hand, if the second HMAC is identical to the first HMAC, the operating system (or the web browser) concludes that the first interaction is an interaction by an actual human user. In this case, the operating system (or the web browser) also indicates to the trusted application that the first HMAC is identical to the second HMAC and thus, the data included in the request is authentic (and not forged/compromised).

In response to the determination that the first HMAC is identical to the second HMAC, the trusted application generates the click attestation token using the data for the first set of parameters included in the request. In generating this click attestation token, the trusted application includes in the payload of the click attestation token (1) data for a first set of parameters that is descriptive of the first interaction and/or (2) data identifying the particular digital component 205. The operating system (or another trusted application on the client device or a web browser) sends the impression attestation token to the server 202 (or another appropriate content verification system) where it may be stored, e.g., stored attestation tokens 218, at the server 202 for validating false digital component alerts 204. For example, the information in the click attestation token can be used to verify that the user who submitted a false digital component alert 204 actually clicked on (or tapped on) the digital component identified in the digital component alert. As such, the system can conclude that the user was, in fact, presented with information on a page to which the digital component linked, which places the user in a position to judge the truthfulness or accuracy of information presented in the digital component and on the page to which the digital component linked.

In some implementations, stored attestation tokens specifying presentation and interaction data for digital components further include multiple conversion tokens, e.g., conversion data 116 as described with reference to FIG. 1. Each of the conversion token included in the stored attestation tokens corresponds to a particular conversion attestation token of the multiple of conversion attestation tokens. For example, conversion attestation tokens can be created for a purchase of digital content, a phone call made to an advertiser, or a physical visit to a brick and mortar location. Conversion attestation tokens provide further support that the reporting user is qualified to assess whether the digital component is a false digital component. Each conversion attestation token can include information about the conversion (e.g., conversion event, identifier of a client device used to perform the conversion event, time of the conversion event, etc.), and be secured (e.g., digitally signed and/or encrypted) to prevent manipulation of the information carried by the conversion attestation token.

Referring back to FIG. 3, the false digital component alert is validated based on a digital signature included in the false digital component alert, whose corresponding public key matches the public keys in stored attestation tokens specifying presentation and interaction data for the digital component (304).

The validation engine 212 can compare the public key from the operating system 209 or browser 208 for the alert 204 to the public key of a stored attestation token 218 for the particular instantiation of the digital component 205 and determine that the received alert is responsive to a real impression/conversion of the digital component 205. Additionally, the validation engine 212 can verify, from the device integrity token/browser trust token and its digital signature, that the client device/browser is reliable.

In some implementations, validation of the attestation tokens can be performed by the server 202 as follows: the server 202 validates whether the digitally signed token, e.g., the impression attestation token, is authentic by verifying the digital signature. If not, the server 202 concludes that the digital component 205 may not have been displayed on the client device and that there may be an error in the content page, the content platform, or the application. In situations where an impression attestation token cannot be verified for a particular impression of the digital component, the server 202 can ignore (or discard) the false digital component alert 204 corresponding to that particular impression.

If the server 202 determines that the digitally signed token is authentic, it next determines whether the data for the attributes included in the payload match the data for the attributes of the digital component provided by the digital component provider. For example, to prove that the digital component is provided by the digital component provider, the digital component provider can digitally sign the digital component, where the digital signature enables verification of authenticity of the digital component.

If the server 202 determines that the data for the attributes match, the server 202 concludes that the particular digital component 205 was provided for display and visible to the user in the particular portion of the device's display is indeed provided by the digital component provider. In these situations, the server 202 can conclude that the false digital component alert 204 was submitted by a user that was actually presented with a particular digital component 205. If not, the server 202 concludes that the digital component is/was not actually displayed on the client device and that there may be an error in the content page, the content platform, the application, or the digital component provider. In situations where the server 202 concludes that the particular digital component was not actually displayed, the server 202 can ignore (or discard) the false digital component alert 204 corresponding to the impression identified in the false digital component alert 204.

The corresponding click attestation token for the impression attestation token can be used to verify that the interaction is an interaction by an actual human user, or if the interaction has been erroneously generated and/or falsified. As such, the server 202 can use the click attestation token to further ensure that the user who submitted the false digital component alert 204 actually interacted with the particular digital component, which would expose the user to more information related to the particular digital component.

As part of this click verification, the server 202 validates whether the click attestation token is authentic. If not, the server 202 concludes that the interaction is not an interaction by an actual human user and that there may be an error in the application (and/or its SDK) and/or the content platform. In situations where the click attestation token is not authentic, the server 202 can ignore (or discard) the false digital component alert 204 corresponding to the click (or impression) identified in the false digital component alert 204.

If the server 202 determines that the click attestation token is authentic, the server 202 uses a rules-engine or another statistical model (e.g., a supervised or unsupervised machine learning model) to determine whether the data for the first set of parameters indicates that the interaction is an interaction by an actual human user. Based on this processing, the server 202 can either conclude that the interaction is an interaction by an actual human user, or not.

The server 202 can conclude from the validation of the impression attestation token and click attestation tokens whether the alert 204 is authentic and representative of a real impression and interaction of the digital component by a human user. Thus, the false digital component alert 204 can be validated as authentic, and from a user who was actually presented and/or interacted with the particular digital component, using the impression and click attestation tokens.

In some implementations, validating the false digital component alert includes determining the false digital component alert includes other relevant conversion attestation tokens for the digital component. For example, validating the false digital component alert can include determining that the alert includes conversion data related to an in-application purchase, a click-to-call, or a visit to a physical store location by the receiving user.

In response to validating the false digital component alert, the false digital component alert is added to an aggregated report for the digital component (306). The validated alerts 220 can be provided to an aggregation engine 214 at the server 202. The aggregated report for the particular digital component can track a number of validated alerts 220 for the particular digital component 205. In some implementations, the aggregated report may track other information, e.g., regionality of the validated alerts, a time-dependence of the validated alerts, or other statistics related to the validated alerts for the digital component.

Based on a false alert ratio it is determined that a magnitude of validated false digital component alerts in the aggregated report for the digital component meets a threshold (308). The aggregation engine 214 can compare the validated alerts 220 to the stored attestation tokens 218 for the particular digital component 205. For example, the server 202 can compare a ratio of validated alerts 220 versus a total number of validated impressions/conversions for the digital component 205*a*. In this example, a threshold is met when the ratio of validated alerts exceeds a particular number or range, e.g., greater than 10% of total impressions/conversions for the digital component are reported as false digital component.

A false digital component mitigation response is triggered based on the magnitude of the validated false digital component alerts meeting the threshold (310). In response to determining that the threshold is met, the aggregation engine 214 will trigger a false digital component mitigation response 222 at the response generator 216. The response generator 216 can determine a type of false information warning to provide with new presentations of the digital component based on, for example, a classification of the digital component. A classification of the digital component can include, for example, an advertisement or a news or other information article. In one example, a digital component 205*b* that is a news article can trigger a false information warning 224*b* that warns a user of the fake news by presenting the digital component 205*b* with a border or overlay.

In some implementations, the response generator can determine a type of false information warning to provide based on a type of client device presenting the digital component. For example, a digital component 205*b* that is to be presented in an application environment 228 can trigger a false information warning 224*a* including a pop-up warning 224*a* including one or more action buttons 225*a* for the user to select after interacting with the digital component 205*a*.

In some implementations, a false information warning 224 is a false digital component report including reporting statistics, e.g., regionality of the alerts, that are anonymized to protect the reporting user privacy. The false digital component report can include information to be used by digital component providers 207, web browsers, or application providers to better understand the digital components being reported as false digital components.

A false information warning is provided with the false digital component to one or more client devices (312). The false information warning 224 can be provided to the digital component provider 207, client devices 206, and/or website browsers 208. The false information warning 224 can be queried by digital component provider 207 from the server 202 prior to providing the digital component 205 for presentation to a user so that the false information warning 224 can be provided with the digital component 205. In one example, web browser 208 can query the server 202 for the false information warning 224 for a particular news article to be provided in a webpage for presentation to a user.

In some implementations, the distribution of the false digital component can be reduced or halted based in part on the false digital component mitigation response. The distribution of the false digital component can be reduced or halted by the digital component provider 207. In one example, the digital component provider 207 can determine to halt or reduce distribution of a particular digital component 205 that has been labeled as false by a threshold magnitude of users in a particular region, e.g., in a particular country. In some implementations, the distribution of the false digital component can be reduced or halted by the browser 208, application 228 or operating system 209 in response to the false digital component mitigation response, e.g., a report generating by the server 202 and queried by the browser 208, application 228, or operating system 209 prior to publishing the digital component.

In some implementations, the distribution of the false digital component can be reduced or halted by preventing output of the false digital component on the client devices 206 in response to the false digital component mitigation response. As such, a reduction in computing resources is achieved by not wasting resources in processing and rendering false information in the false digital component.

Figure 4:
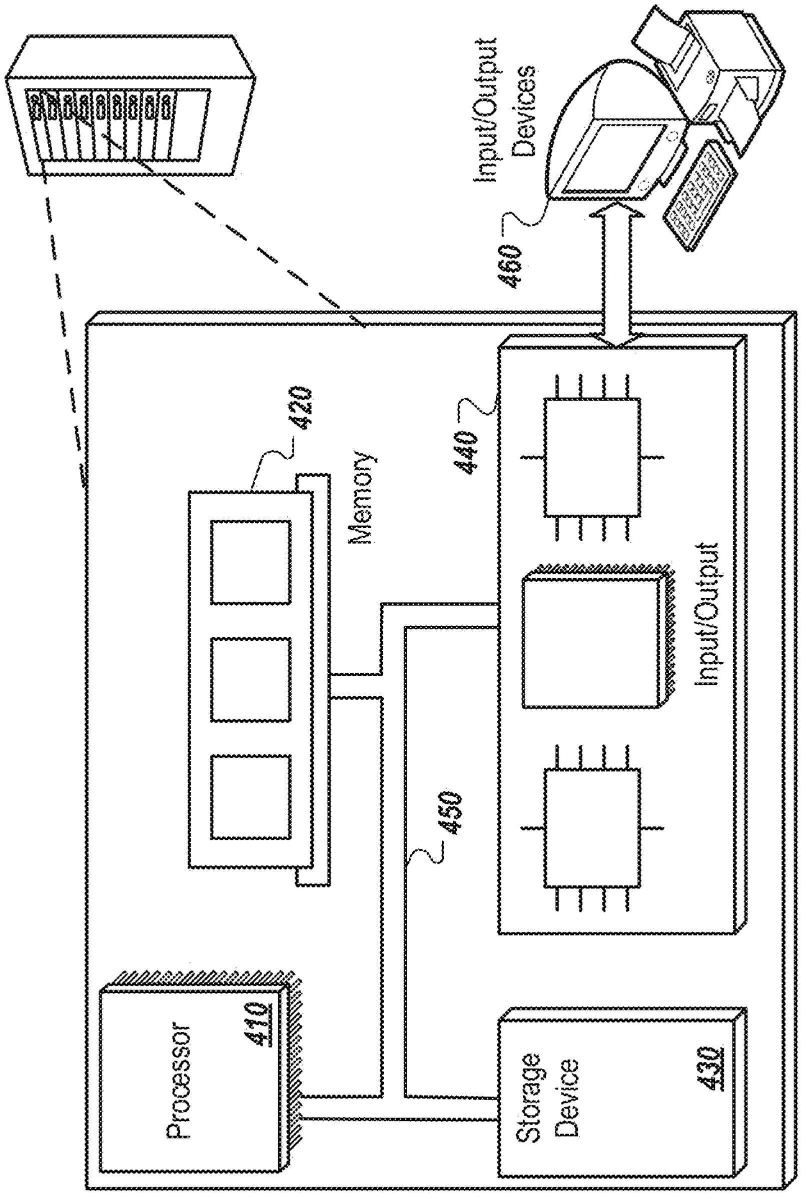
FIG. 4 is a block diagram of an example computer system.
Figure 4:

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term “data processing apparatus” encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A user may be provided with controls allowing the user to make an election as to both if and when systems, programs, or features described herein may enable collection of user information (e.g., information about a user's social network, social actions, or activities, profession, a user's preferences, or a user's current location), and if the user is sent personalized content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, the information retention policy, and what information is provided to the user.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more servers, the method comprising:

storing, by one or more servers, a plurality of impression attestation tokens for a plurality of presentations of a digital component;

storing, by the one or more servers, a plurality of click attestation tokens that each correspond to a particular impression attestation token among the plurality of impression attestation tokens;

comparing, by the one or more servers, presentation data and interaction data of a false digital component alert with the plurality of impression attestation tokens and the plurality of click attestation tokens;

determining, by the one or more servers and based on the comparing, that the false digital component alert includes (i) a particular impression attestation token from among the stored plurality of impression attestation tokens and (ii) a corresponding particular click attestation token from among the stored plurality of click attestation tokens;

validating, by the one or more servers, the false digital component alert by verifying a digital signature included in the particular impression attestation token using a public key associated with a client device or browser that generated the particular impression attestation token, wherein the validating is based on the determination that the false digital component alert includes the particular impression attestation token and the corresponding particular click attestation token;

in response to validating the false digital component alert, adding the false digital component alert to an aggregated report for the digital component;

determining, by the one or more servers, that a magnitude of validated false digital component alerts in the aggregated report for the digital component meets a threshold; and adjusting, by the one or more servers, distribution of the digital component to client devices based on the magnitude of the validated false digital component alerts meeting the threshold.

2. The method of claim 1, further comprising causing presentation of a false information warning with the digital component to one or more client devices or a digital component provider.

3. The method of claim 1, wherein adjusting distribution of the digital component comprises reducing a frequency of distribution of the digital component or halting distribution of the digital component.

4. The method of claim 3, wherein the reducing the frequency of distribution of the digital component or halting distribution of the digital component is performed by a browser, an application, or an operating system of the client device.

5. The method of claim 1, wherein adjusting distribution of the digital component to client devices comprises reducing distribution of the digital component or halting distribution of the digital component by a browser, an application, or an operating system of another client device.

6. The method of claim 1, wherein each impression attestation token of the plurality of impression attestation tokens comprises i) a campaign ID, ii) a date/time of presentation, and iii) a uniform resource locator for a landing page linked to by a particular digital component, a phone number for a publisher of the particular digital component, or an address or geo-fencing associated with location of a store for the publisher of the particular digital component.

7. The method of claim 1, wherein each click attestation token of the plurality of click attestation tokens comprises a conversion confirmation of a user action performed in response to the presentation of the digital component.

8. The method of claim 2, wherein causing presentation of the false information warning to one or more client devices with the digital component comprises causing presentation of a visual signal with the digital component on a client device.

9. The method of claim 8, wherein causing presentation of the visual signal comprises causing presentation of a user interface element that is configured to prevent the client device from (i) proceeding to a landing page defined by the digital component, (ii) proceeding to dial a phone number defined by the digital component, or (iii) proceeding to locate a location defined by the digital component.

10. The method of claim 2, wherein causing presentation of the false information warning comprises causing presentation of a validated false digital component report to a publisher of the digital component.

11. A non-transitory computer storage medium encoded with a computer program, the program comprising instructions that when executed by data processing apparatus cause the data processing apparatus to perform a process comprising:

storing a plurality of impression attestation tokens for a plurality of presentations of a digital component;

storing a plurality of click attestation tokens that each correspond to a particular impression attestation token among the plurality of impression attestation tokens;

comparing presentation data and interaction data of a false digital component alert with the plurality of impression attestation tokens and the plurality of click attestation tokens;

determining, based on the comparing, that the false digital component alert includes (i) a particular impression attestation token from among the stored plurality of impression attestation tokens and (ii) a corresponding particular click attestation token from among the stored plurality of click attestation tokens;

validating the false digital component alert by verifying a digital signature included in the particular impression attestation token using a public key associated with a client device or browser that generated the particular impression attestation token, wherein the validating is based on the determination that the false digital component alert includes the particular impression attestation token and the corresponding particular click attestation token;

in response to validating the false digital component alert, adding the false digital component alert to an aggregated report for the digital component;

determining that a magnitude of validated false digital component alerts in the aggregated report for the digital component meets a threshold; and adjusting distribution of the digital component to client devices based on the magnitude of the validated false digital component alerts meeting the threshold.

12. The non-transitory computer storage medium of claim 11, wherein the instructions cause the data processing apparatus to perform operations further comprising causing presentation of a false information warning with the digital component to one or more client devices or a digital component provider.

13. The non-transitory computer storage medium of claim 11, wherein adjusting distribution of the digital component comprises reducing a frequency of distribution of the digital component or halting distribution of the digital component.

14. The non-transitory computer storage medium of claim 13, wherein the reducing the frequency of distribution of the digital component or halting distribution of the digital component is performed by a browser, an application, or an operating system of the client device.

15. The non-transitory computer storage medium of claim 11, wherein adjusting distribution of the digital component to client devices comprises reducing distribution of the digital component or halting distribution of the digital component by a browser, an application, or an operating system of another client device.

16. The non-transitory computer storage medium of claim 11, wherein each impression attestation token of the plurality of impression attestation tokens comprises i) a campaign ID, ii) a date/time of presentation, and iii) a uniform resource locator for a landing page linked to by a particular digital component, a phone number for a publisher of the particular digital component, or an address or geo-fencing associated with location of a store for the publisher of the particular digital component.

17. A system comprising:

a client device; and one or more servers configured and operable to interact with the device and to perform the operations comprising:

storing a plurality of impression attestation tokens for a plurality of presentations of a digital component;

storing a plurality of click attestation tokens that each correspond to a particular impression attestation token among the plurality of impression attestation tokens;

comparing presentation data and interaction data of a false digital component alert with the plurality of impression attestation tokens and the plurality of click attestation tokens;

determining, based on the comparing, that the false digital component alert includes (i) a particular impression attestation token from among the stored plurality of impression attestation tokens and (ii) a corresponding particular click attestation token from among the stored plurality of click attestation tokens;

validating the false digital component alert by verifying a digital signature included in the particular impression attestation token using a public key associated with a client device or browser that generated the particular impression attestation token, wherein the validating is based on the determination that the false digital component alert includes the particular impression attestation token and the corresponding particular click attestation token;

in response to validating the false digital component alert, adding the false digital component alert to an aggregated report for the digital component;

determining that a magnitude of validated false digital component alerts in the aggregated report for the digital component meets a threshold; and adjusting distribution of the digital component to client devices based on the magnitude of the validated false digital component alerts meeting the threshold.

18. The system of claim 17, wherein the one or more servers are configured to perform operations further comprising causing presentation of a false information warning with the digital component to one or more client devices or a digital component provider.

19. The system of claim 18, wherein causing presentation of the false information warning to one or more client devices with the digital component comprises causing presentation of a visual signal with the digital component on a client device.

20. The system of claim 19, wherein causing presentation of the visual signal comprises causing presentation of a user interface element that is configured to prevent the client device from (i) proceeding to a landing page defined by the digital component, (ii) proceeding to dial a phone number defined by the digital component, or (iii) proceeding to locate a location defined by the digital component.

21. The system of claim 18, wherein causing presentation of the false information warning comprises causing presentation of a validated false digital component report to a publisher of the digital component.

* * * * *